(12) United States Patent
Garzon et al.

(10) Patent No.: US 8,830,614 B2
(45) Date of Patent: Sep. 9, 2014

(54) BALANCED EMBEDDED CONTACT SENSOR WITH LOW NOISE ARCHITECTURE

(75) Inventors: Samir Y. Garzon, Sunnyvale, CA (US); Rehan Ahmed Zakai, San Ramon, CA (US); John Thomas Contreras, Palo Alto, CA (US)

(73) Assignee: HGST Netherlands B.V., Amsterdam (NL)

( * ) Notice: Subject to any disclaimer, the term of this patent is extended or adjusted under 35 U.S.C. 154(b) by 175 days.

(21) Appl. No.: 13/333,518

(22) Filed: Dec. 21, 2011

(65) Prior Publication Data

US 2013/0163110 A1    Jun. 27, 2013

(51) Int. Cl.
*G11B 5/60* (2006.01)

(52) U.S. Cl.
USPC .................. 360/55; 360/294.7; 360/234.4

(58) Field of Classification Search
None
See application file for complete search history.

(56) References Cited

U.S. PATENT DOCUMENTS

| | | | |
|---|---|---|---|
| 6,067,203 A * | 5/2000 | Ottesen et al. ............. 360/73.03 |
| 6,181,520 B1 | 1/2001 | Fukuda |
| 6,239,951 B1 | 5/2001 | Wang et al. |
| 6,486,660 B1 | 11/2002 | Luse et al. |
| 6,907,322 B2 | 6/2005 | Ghoshal |
| 6,999,265 B1 | 2/2006 | Schreck et al. |
| 7,177,782 B2 | 2/2007 | Falik et al. |
| 7,233,459 B2 | 6/2007 | Zhu |
| 7,262,936 B2 | 8/2007 | Hamann et al. |
| 7,312,941 B2 | 12/2007 | Hirano et al. |
| 7,450,333 B2 | 11/2008 | Hirano et al. |
| 7,477,470 B2 * | 1/2009 | Leis et al. ........................ 360/75 |
| 7,589,928 B2 | 9/2009 | Roy et al. |
| 7,719,786 B1 | 5/2010 | Baumgart et al. |
| 7,796,356 B1 | 9/2010 | Fowler et al. |
| 7,800,858 B1 | 9/2010 | Bajikar et al. |
| 7,808,741 B2 | 10/2010 | Matsumoto et al. |
| 7,936,538 B1 | 5/2011 | Zhang et al. |
| 7,952,829 B2 | 5/2011 | Ionescu |
| 7,969,685 B2 | 6/2011 | Shen et al. |
| 2005/0174665 A1 | 8/2005 | Zhang et al. |
| 2005/0270684 A1 * | 12/2005 | Baumgart et al. .............. 360/75 |
| 2008/0247095 A1 | 10/2008 | Kim et al. |

(Continued)

OTHER PUBLICATIONS

EPCOS, "NTC Thermistors", Application Notes, EPCOS AG 2009, 9 pages, Feb. 2009.

(Continued)

*Primary Examiner* — Wayne Young
*Assistant Examiner* — Brian Butcher
(74) *Attorney, Agent, or Firm* — Brokaw Patent Law PC; Christopher J. Brokaw (57) ABSTRACT

Approaches for a hard-disk drive (HDD) having a balanced resistive temperature detector (RTD). A HDD includes a head slider comprising a single RTD. A read/write IC comprises a balance resistor having the same resistance as the single RTD when the head slider is not in physical contact with the disk. The same amount of current flows through the single RTD and the balance resistor except when the head slider is in physical contact with the disk. Detecting a voltage change across the single RTD enables physical contact between the head slider and the disk to be accurately detected using a circuit with low noise. Alternately, the head slider may include two RTDs connected in sequence, and the balance resistor may possess the same resistance as the two RTDs. The two RTDs may vary inversely with environmental changes to avoid the need to recalibrate the balance resistor after any environmental change.

20 Claims, 6 Drawing Sheets

(56) References Cited

U.S. PATENT DOCUMENTS

| | | |
|---|---|---|
| 2010/0027154 A1 | 2/2010 | Sonoda |
| 2010/0073795 A1 | 3/2010 | Amano |
| 2011/0069408 A1 | 3/2011 | Kurita et al. |
| 2011/0157736 A1 | 6/2011 | Contreras et al. |
| 2011/0157740 A1 | 6/2011 | Baumgart et al. |
| 2012/0120522 A1* | 5/2012 | Johnson et al. ............ 360/75 |
| 2013/0050867 A1 | 2/2013 | Yamane et al. |

OTHER PUBLICATIONS

E. Schreck, R.E. Fontana, Jr., and G. P. Singh, Thin Film Thermocouple Sensors for Measurement of Contact Temperatures During Slider ASperity Interaction on Magnetic Recording Disks, IEEE Transactions on Magnetics, vol. 28., No. 5, Sep. 1992, pp. 2548-2550.

* cited by examiner

BALANCED EMBEDDED CONTACT SENSOR WITH LOW NOISE ARCHITECTURE

RELATED APPLICATION DATA

This application is related to U.S. patent application Ser. No. 13/333,565, entitled "Distributed Temperature Detector Architecture for Head Disk Interface Systems," invented by John Contreras et al., filed on Dec. 21, 2011, the disclosure of which is incorporated by reference in its entirety for all purposes as if fully set forth herein.

This application is related to U.S. patent application Ser. No. 10/691,752, Patent Publication No., 2005/0088772, entitled "Magnetic Recording Disk Drive with Actively Controlled Electric Potential at the Head/Disk Interface for Wear and Durability Control," invented by Peter Michael Baumgart et al., filed on Oct. 22, 2003, the disclosure of which is incorporated by reference in its entirety for all purposes as if fully set forth herein.

FIELD OF THE INVENTION

Embodiments of the invention relate to a balanced embedded contact sensor for use in a head disk interface system of a hard-disk drive (HDD).

BACKGROUND OF THE INVENTION

A hard-disk drive (HDD) is a non-volatile storage device that is housed in a protective enclosure and stores digitally encoded data on one or more circular disks having magnetic surfaces (a disk may also be referred to as a platter). When an HDD is in operation, each magnetic-recording disk is rapidly rotated by a spindle system. Data is read from and written to a magnetic-recording disk using a read/write head which is positioned over a specific location of a disk by an actuator.

A read/write head uses a magnetic field to read data from and write data to the surface of a magnetic-recording disk. As a magnetic dipole field decreases rapidly with distance from a magnetic pole, the distance between a read/write head and the surface of a magnetic-recording disk must be tightly controlled. An actuator relies on suspension's force on the read/write head to provide the proper distance between the read/write head and the surface of the magnetic-recording disk while the magnetic-recording disk rotates. A read/write head therefore is said to "fly" over the surface of the magnetic-recording disk. When the magnetic-recording disk stops spinning, a read/write head must either "land" or be pulled away onto a mechanical landing ramp from the disk surface.

Resistor temperature detector (RTD) architectures have been used in the prior art to determine when the read/write head makes physical contact with the magnetic-recording disk based upon the temperature of the read/write head. RTD architectures in the prior art have been implemented using a single temperature sensor that measures temperature based on the amount of voltage across a single temperature sensor. However, prior art approaches exhibit an unsatisfactory amount of noise, which complicates accurate measurements.

SUMMARY OF THE INVENTION

Approaches described herein teach a balanced embedded contact sensor (bECS) for a head-disk interface (HDI) system. A balanced embedded contact sensor of an embodiment may be implemented by a resistive temperature detector (RTD) that is comprised within a head slider. This RTD is located on an arm of a bridge circuit which has another arm that includes a balanced resistor that is located within the read/write integrated circuit (IC). The balanced resistor is configured to have the same resistance as the RTD in the head slider except when the head slider is in physical contact with the magnetic-recording disk. The bridge circuit of an embodiment allows the affect of noise generated at the head slider to be cancelled at the read/write integrated circuit (IC). As a result, accurate temperature measurements of the head slider may be obtained, thereby enabling embodiments to detect physical contact between the head slider and the magnetic-recording disk with greater precision than prior approaches.

In an another embodiment of the invention, a hard-disk drive (HDD) comprises a head slider that includes a first resistive temperature detector (RTD) and a second resistive temperature detector (RTD). The first RTD and the second RTD are connected in sequence. Any change in temperature causes (a) an increase in resistance of a particular magnitude in the first RTD and (b) a decrease in resistance of the same magnitude in the second RTD. In this way, any environmental change that causes an increase in resistance in one RTD will cause an opposite change in the other resistor, and so the first RTD and the second RTD will provide a constant amount of resistance in the face of any environmental change. This avoids the need to recalibrate the balance resistor located in the read/write IC if the HDD is taken to a different environment having a difference in altitude, pressure, temperature, or humidity.

Embodiments discussed in the Summary of the Invention section are not meant to suggest, describe, or teach all the embodiments discussed herein. Thus, embodiments of the invention may contain additional or different features than those discussed in this section.

BRIEF DESCRIPTION OF THE DRAWINGS

Embodiments of the invention are illustrated by way of example, and not by way of limitation, in the figures of the accompanying drawings and in which like reference numerals refer to similar elements and in which.

DETAILED DESCRIPTION OF THE INVENTION

Approaches for a balanced embedded contact sensor (bECS) for a head-disk interface (HDI) system are described. In the following description, for the purposes of explanation, numerous specific details are set forth in order to provide a thorough understanding of the embodiments of the invention described herein. It will be apparent, however, that embodiments of the invention described herein may be practiced without these specific details. In other instances, well-known structures and devices are shown in block diagram form in order to avoid unnecessarily obscuring the embodiments of the invention described herein.

Physical Description of Illustrative Embodiments of the Invention

Figure 1:
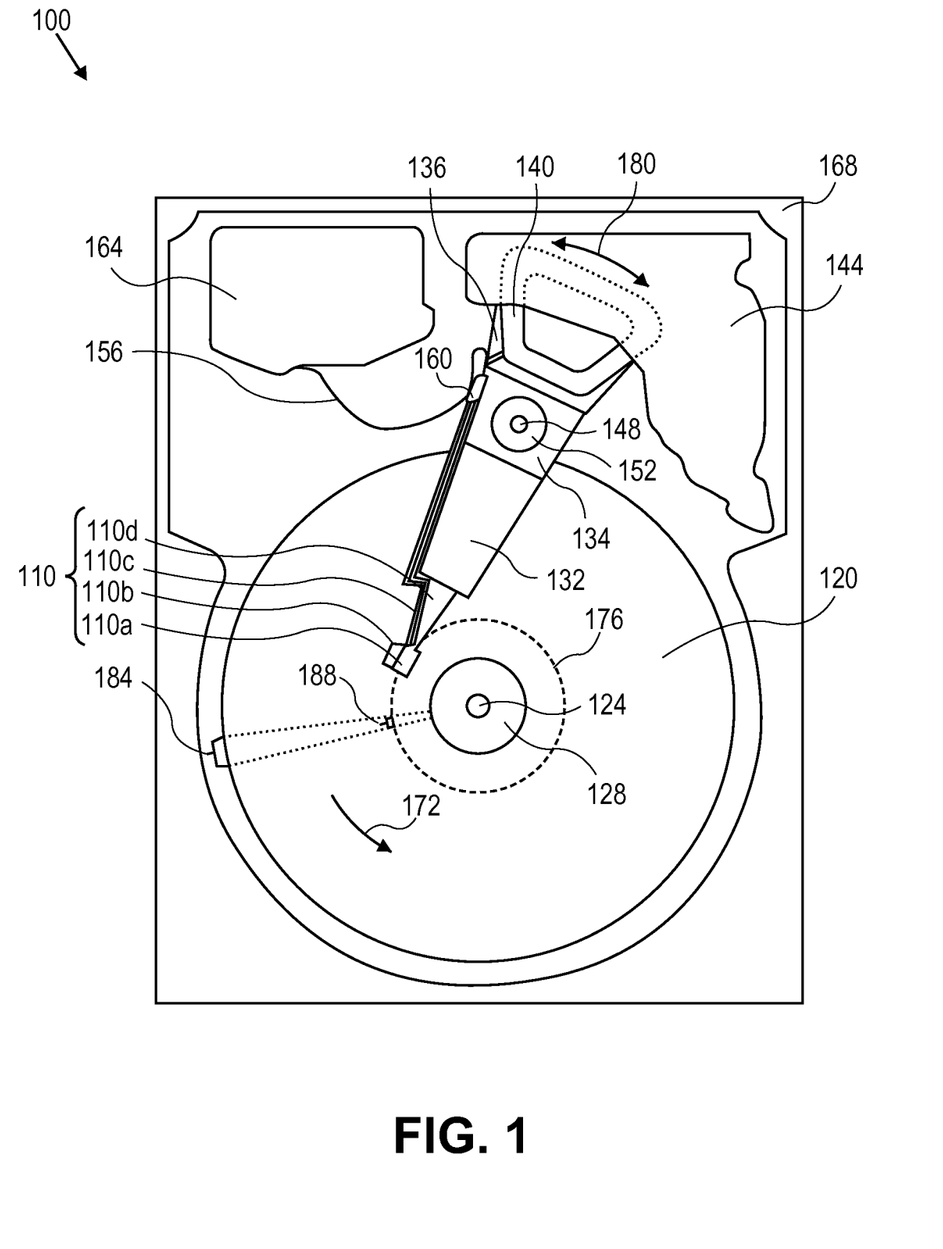
FIG. 1 is a plan view of an HDD according to an embodiment of the invention.

Embodiments of the invention may be used to detect when the head slider makes physical contact with the magnetic-recording disk with greater precision than prior approaches. Embodiments of the invention may be incorporated with a hard-disk drive (HDD). In accordance with an embodiment of the invention, a plan view of a HDD 100 is shown in FIG. 1. FIG. 1 illustrates the functional arrangement of components of the HDD including a slider 110*b* that includes a magnetic-reading/recording head 110*a*. Collectively, slider 110B and head 110*a* may be referred to as a head slider. The HDD 100 includes at least one head gimbal assembly (HGA) 110 including the head 110*a*, a lead suspension 110*c* attached to the head 110*a*, and a load beam 110*d* attached to the slider 110*b*, which includes the head 110*a* at a distal end of the slider 110*b*; the slider 110*b* is attached at the distal end of the load beam 110*d* to a gimbal portion of the load beam 110*d*. The HDD 100 also includes at least one magnetic-recording disk 120 rotatably mounted on a spindle 124 and a drive motor (not shown) attached to the spindle 124 for rotating the disk 120. The head 110*a* includes a write element and a read element for respectively writing and reading information stored on the disk 120 of the HDD 100. The disk 120 or a plurality (not shown) of disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown); the armature 136 of the VCM is attached to the carriage 134 and is configured to move the arm 132 and the HGA 110 to access portions of the disk 120 being mounted on a pivot-shaft 148 with an interposed pivot-bearing assembly 152.

With further reference to FIG. 1, in accordance with an embodiment of the present invention, electrical signals, for example, current to the voice coil 140 of the VCM, write signal to and read signal from the PMR head 110*a*, are provided by a flexible cable 156. Interconnection between the flexible cable 156 and the head 110*a* may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the head 110*a* of the HGA 110. The electrical signal provided to the drive motor enables the drive motor to spin providing a torque to the spindle 124 which is in turn transmitted to the disk 120 that is affixed to the spindle 124 by the disk clamp 128; as a result, the disk 120 spins in a direction 172. The spinning disk 120 creates a cushion of air that acts as an air-bearing on which the air-bearing surface (ABS) of the slider 110*b* rides so that the slider 110*b* flies above the surface of the disk 120 without making contact with a thin magnetic-recording medium of the disk 120 in which information is recorded. The electrical signal provided to the voice coil 140 of the VCM enables the head 110*a* of the HGA 110 to access a track 176 on which information is recorded. Thus, the armature 136 of the VCM swings through an arc 180 which enables the HGA 110 attached to the armature 136 by the arm 132 to access various tracks on the disk 120. Information is stored on the disk 120 in a plurality of concentric tracks (not shown) arranged in sectors on the disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the head 110*a* of the HGA 110 reads the servo-burst-signal pattern which provides a position-error-signal (PES) to the servo electronics, which controls the electrical signal provided to the voice coil 140 of the VCM, enabling the head 110*a* to follow the track 176. Upon finding the track 176 and identifying a particular sectored track portion 188, the head 110*a* either reads data from the track 176 or writes data to the track 176 depending on instructions received by the disk controller from an external agent, for example, a microprocessor of a computer system.

Embodiments of the invention also encompass HDD 100 that includes the HGA 110, the disk 120 rotatably mounted on the spindle 124, the arm 132 attached to the HGA 110 including the slider 110*b* including the head 110*a*.

Figure 2:
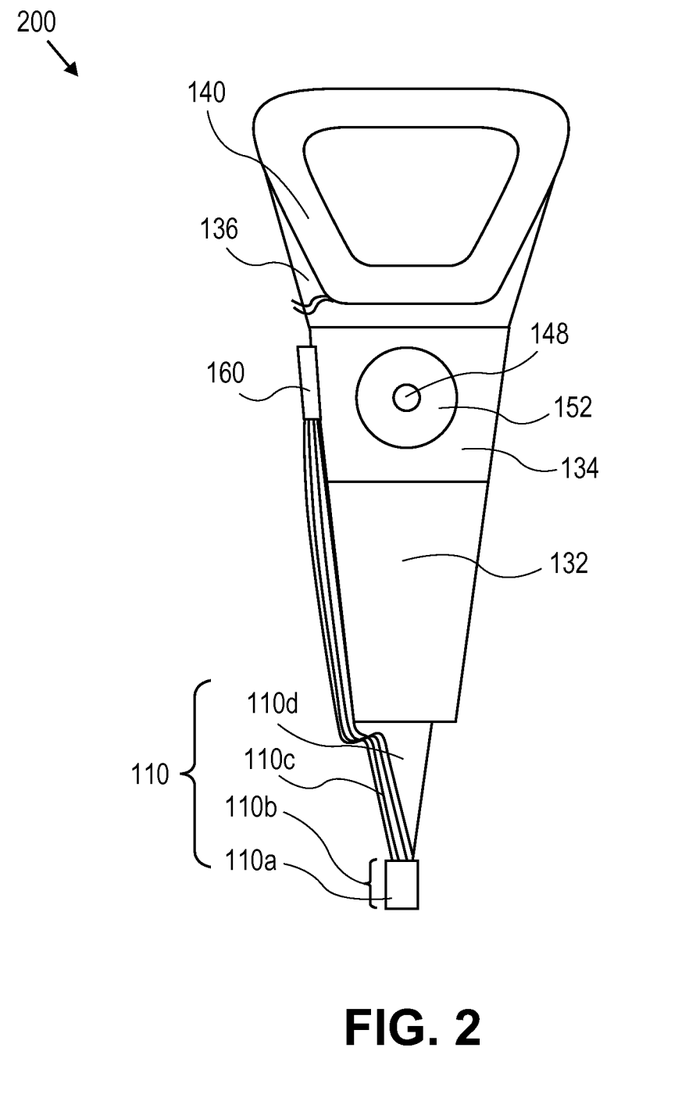
FIG. 2 is a plan view of a head-arm-assembly (HAA) according to an embodiment of the invention.

With reference now to FIG. 2, in accordance with an embodiment of the present invention, a plan view of a head-arm-assembly (HAA) including the HGA 110 is shown. FIG. 2 illustrates the functional arrangement of the HAA with respect to the HGA 110. The HAA includes the arm 132 and HGA 110 including the slider 110*b* including the head 110*a*. The HAA is attached at the arm 132 to the carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 2, the armature 136 of the VCM is attached to the carriage 134 and the voice coil 140 is attached to the armature 136. The AE 160 may be attached to the carriage 134 as shown. The carriage 134 is mounted on the pivot-shaft 148 with the interposed pivot-bearing assembly 152.

Figure 3:
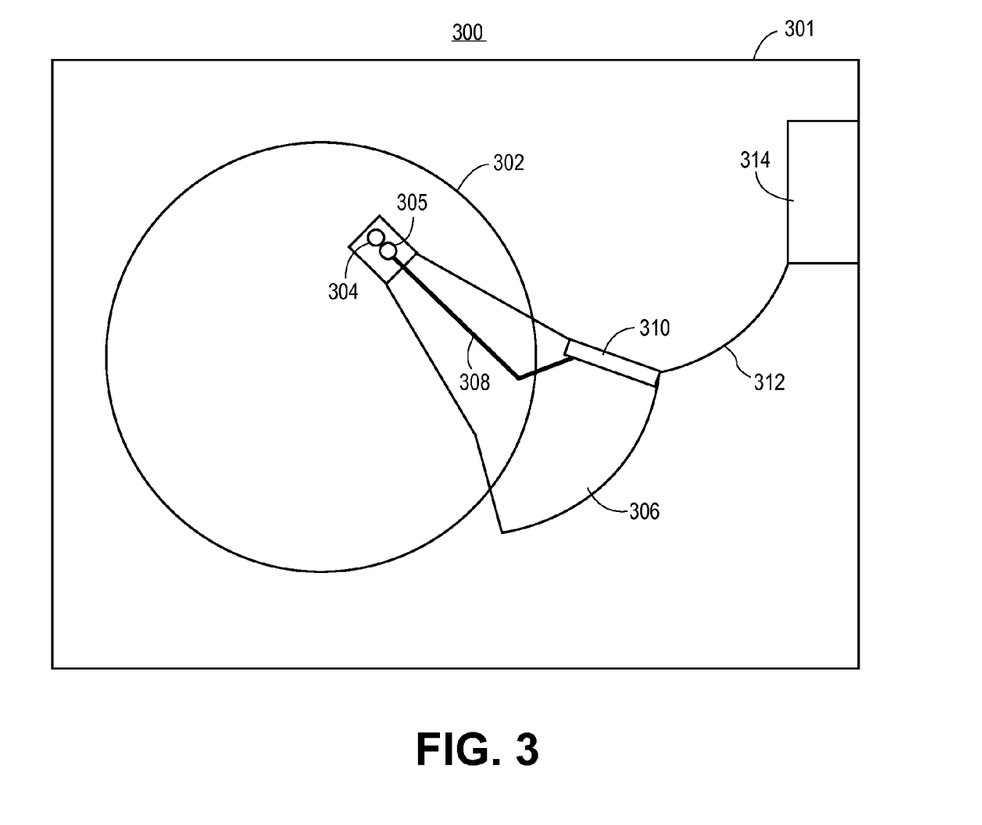
FIG. 3 is an illustration of a read/write circuit within an HDD according to an embodiment of the invention.

FIG. 3 is an illustration of a read/write circuit 310 within an HDD according to an embodiment of the invention. FIG. 3 depicts hard-disk drive (HDD) 300 which includes enclosure 301 that contains one or more magnetic platters or disks 302, read elements 304, write elements 305, an actuator arm suspension 306, a transmission line interconnect 308, a read/write integrated circuit (IC) 310, a flexible interconnect cable 312, and a disk enclosure connector 314.

Electrical signals are communicated between the read/write elements and read/write integrated circuit 310 over transmission line interconnect 308. Read/write integrated circuit 310 conditions the electrical signals so that they can drive write element 305 during writing and amplifies the electrical signal from read element 304 during reading. Signals are communicated between read/write integrated circuit 310 and disk enclosure connector 314 over flexible cable 312. Disk enclosure connector 314 conducts signals with circuitry external to disk enclosure 301. In other embodiments, read/write integrated circuit (IC) 310 is located elsewhere than depicted in FIG. 3, such as on flex cable 312 or on printed circuit board (PCB) within the hard-disk drive.

Balanced Embedded Contact Sensor (BECS)

Figure 4:
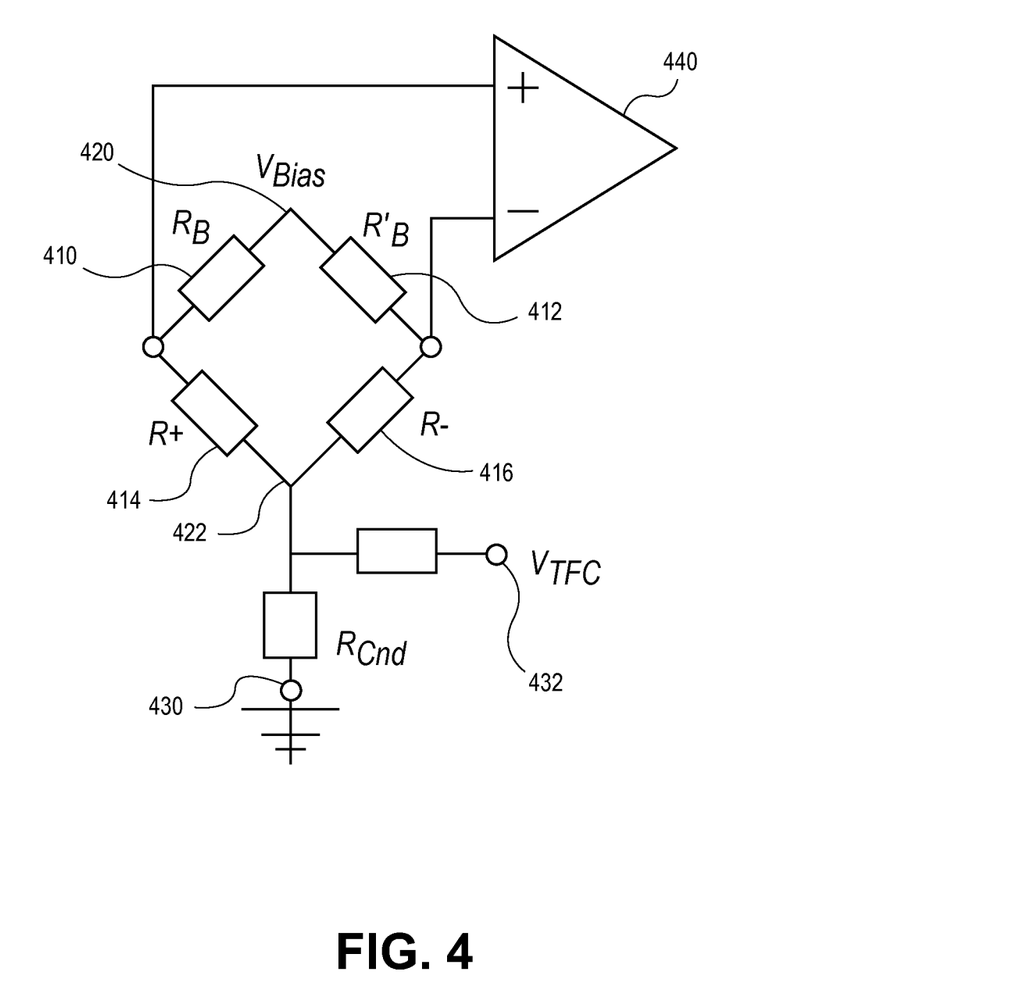
FIG. 4 is an illustration of a Wheatstone bridge bias and detection circuit employed by embodiments of the invention.

FIG. 4 is an illustration of a Wheatstone bridge bias and detection circuit 400 employed by embodiments of the invention. The circuit of FIG. 4 will be discussed below to illustrate certain operational principles of embodiments. In FIG. 4, tunable bias resistors 410 and 412 have resistances values of $R_B$ and $R'_B$ respectively, while resistive temperature detectors (RTDs) 414 and 416 have resistances values of $R_+$ and $R_-$ respectively. The sum of the resistances of $R_B$ and $R'_B$ is much larger than the sum of the resistances of $R_+$ and $R_-$.

A common voltage $V_{Bias}$ is applied to tunable bias resistors 410 and 412 at source 420 to current bias resistive temperature detectors (RTDs) 414 and 416. Current will flow to ground 430 through shared terminal 422 of RTDs 414 and 416. Shared terminal 422 is also coupled to TFC ground 432. In this configuration, noise from voltage source 420 is common mode and is not sensed by differential amplifier 440, which provides immunity to external noise. In addition, the noise from tunable bias resistors 410 and 412 are negligible (factors of $R_+/R_B$ and $R_-/R'_B$ smaller than the thermal noise from $R_+$ and $R_-$). Therefore, the system noise may be given by the thermal noise as expressed by $4 k_B T (R_+ + R_-)$ plus noise from amplifier 440.

Figure 5:
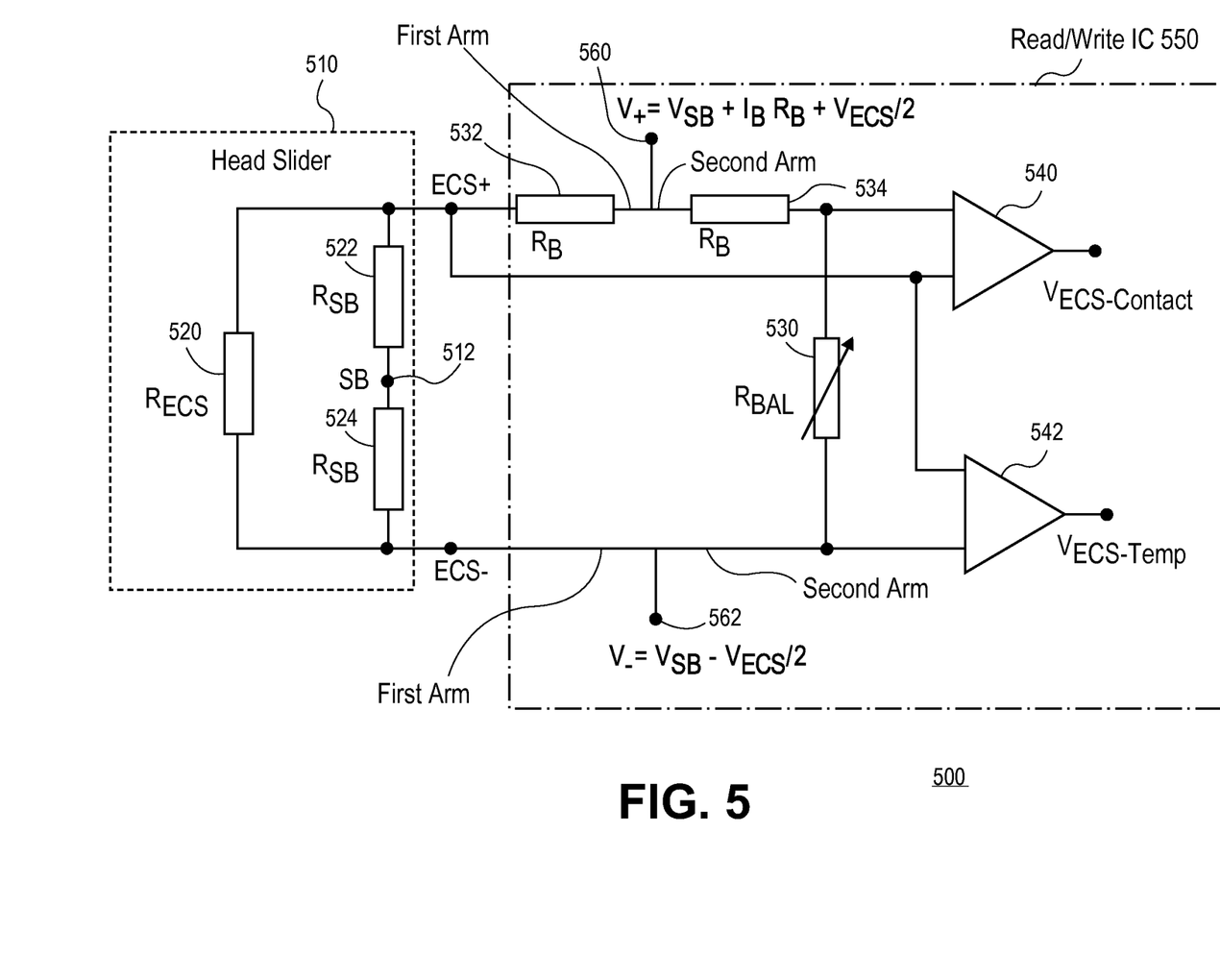
FIG. 5 is an illustration of a balanced embedded contact sensor (bECS) architecture having a single RTD according to an embodiment of the invention.

FIG. 5 depicts a balanced embedded contact sensor (bECS) architecture 500 according to an embodiment of the invention. The embodiment of FIG. 5 employs the low noise circuit depicted in FIG. 4, where a first arm of the circuit is comprised within head slider 510 and a second arm of the circuit is comprised within read/write IC 550. The circuit arms of bECS architecture 500 may be arms of a Wheatstone bridge type circuit. FIG. 5 depicts head slider 510 and the relevant elements therein, namely RTD 520 and resistors 522 and 524. RTD 520 has a resistance value of $R_{ECS}$ and resistors 522 and 524 each have a resistance of $R_{SB}$.

In an embodiment, RTD 520 may be embodied as a thermistor. RTD 520 may be composed of, but not limited to, metallic (e.g., NiFe) and semiconductor materials. RTD 520 may measure temperature based on the voltage drop associated therewith. Changes in temperature cause a change in the amount of resistance provided by a resistive temperature detector. A small increase in temperature may result in an increase or decreases in voltage across a resistive temperature detector. Thus, the amount of voltage across a resistive temperature detector may be used to identify the temperature associated with the resistive temperature detector.

RTD 520 is located on or proximate to the air bearing surface of head slider 510. When physical contact is made between head slider 510 and the magnetic-recording disk when the magnetic-recording disk is rotating, the resulting friction causes an increase in temperature within head slider 510 originating at the point of contact. The change in temperature resulting from the physical contact will be a gradient as a function of distance from the point of contact. The increase in temperature will cause a measurable change in the voltage across RTD 520.

FIG. 5 also depicts read/write IC 550. Read/write IC 550 comprises balance resistor 530 having a resistance of $R_{BAL}$. Read/write IC 550 also includes resistors 532 and 534 and amplifiers 540 and 542.

The resistance ($R_{SB}$) of each of resistors 522 and 524 is much greater than the resistance ($R_B$) of each of resistors 532 and 534. Resistors 522 and 524 are used to set the voltage for the head slider body 512 to the desired value ($V_{SB}$) by using a feedback loop to control the voltage at the $V_+$ terminal 560 and the $V_-$ terminal 562 (note that the feedback loop is not shown in FIG. 5). Resistors 532 and 534 resistors are used as bias resistors to regulate the current bias along the two arms of the circuit.

The first arm and second arm of the circuit are shown in FIG. 5. Since resistors 522 and 524 have a much greater resistance value than RTD 520, the total value of the resistance from the V+ terminal 560 to the V− terminal 562 along the first arm of the circuit is the resistance value of RTD 520 (which is $R_{ECS}$)+the resistance value of resistor 532 (which is $R_B$). Along the second arm of the circuit, the total value of the resistance from the V+ terminal 560 to the V− terminal 562 is the resistance value of resistor 534 ($R_B$)+the resistance value of balance resistor 530 ($R_{BAL}$). Therefore, by adjusting the resistance $R_{BAL}$ of balance resistor 530, it is possible to balance the bridge circuit (i.e., the first arm and the second arm of the circuit have the same resistance when the circuit is balanced) and remove the baseline signal not related contact between the head slider and the disk. Unless there is physical contact between head slider 510 and the magnetic-recording disk, the same amount of current will flow through both the first arm and the second arm of the circuit. Only changes in the resistance value of RTD 520 ($R_{ECS}$) will be detected by amplifier 540 to generate a voltage signal that mostly contains contact information. Noise generated by the first arm of the circuit is cancelled out by noise generated by the second arm of the circuit, thereby allowing detection of physical contact between head slider 510 and the disk using a low noise circuit.

The resistance ($R_{BAL}$) of balance resistor 530 is calibrated or configured to be equal to the resistance of RTD 520. In an embodiment, the resistance of balance resistor 530 may be calibrated or configured by setting certain electrical switches to place a portion of a plurality of resistors in series to form balance resistor 530 so that the portion of the plurality of resistors forming balance resistor 530 have the desired resistance, i.e., the amount of assistance of RTD 520 when head slider 510 is not in physical contact with the disk. For example, if the total amount of resistance of balance resistor 530 is determined to be 200 ohms when head slider 510 is not in physical contact with the disk, then certain electrical switches may be configured to place a certain number of resistors in series so that the total amount of resistance of the resistors in series is 200 ohms. The calibration or configuration of balance resistor 530 may be performed once during manufacturing or assembly of the hard-disk drive. Optionally, the hard-disk drive may contain a sensor that detects certain environmental changes, such as a change in altitude, humidity, pressure, or temperature. If the hard-disk drive detects an environmental change that exceeds a certain threshold, then the resistance value of balance resistor 530 may be recalibrated or reconfigured as explained above. In this way, if the hard-disk drive is taken to a new environment that may affect the resistance of RTD 520, the resistance of balance resistor 530 may be updated so that it is equal to the resistance of RTD 520 in the new environment.

In an embodiment, amplifier 542 may optionally be connected directly across the ECS terminals (labeled ECS+ and ECS− in FIG. 5) to measure the absolute resistance of ECS. In this configuration, the noise for contact detection is given by $4 K_B T R_{ECS}$ plus the amplifier noise, where T is temperature and $K_B$ is Boltzmann's constant.

In addition, the embodiment depicted in FIG. 5 enables independent control of the head slider body 512 potential (by adjusting $V_{SB}$) and the bias current through RTD 520 by adjusting current $I_B$. In this way, the voltage level associated with ground at head slider 510 may be higher than the voltage level of ground at the magnetic-recording disk. Advantageously, such independent control enables the interface voltage control (IVC) feature discussed in U.S. patent application Ser. No. 10/691,752 to be on or off regardless of the value of $I_B$ chosen to operate RTD 520.

Another advantage provided by the embodiment depicted in FIG. 5 is that circuit 500 may be embodied using a head slider 510 constructed without requiring any special builds since one RTD is employed within head slider 510.

Figure 6:
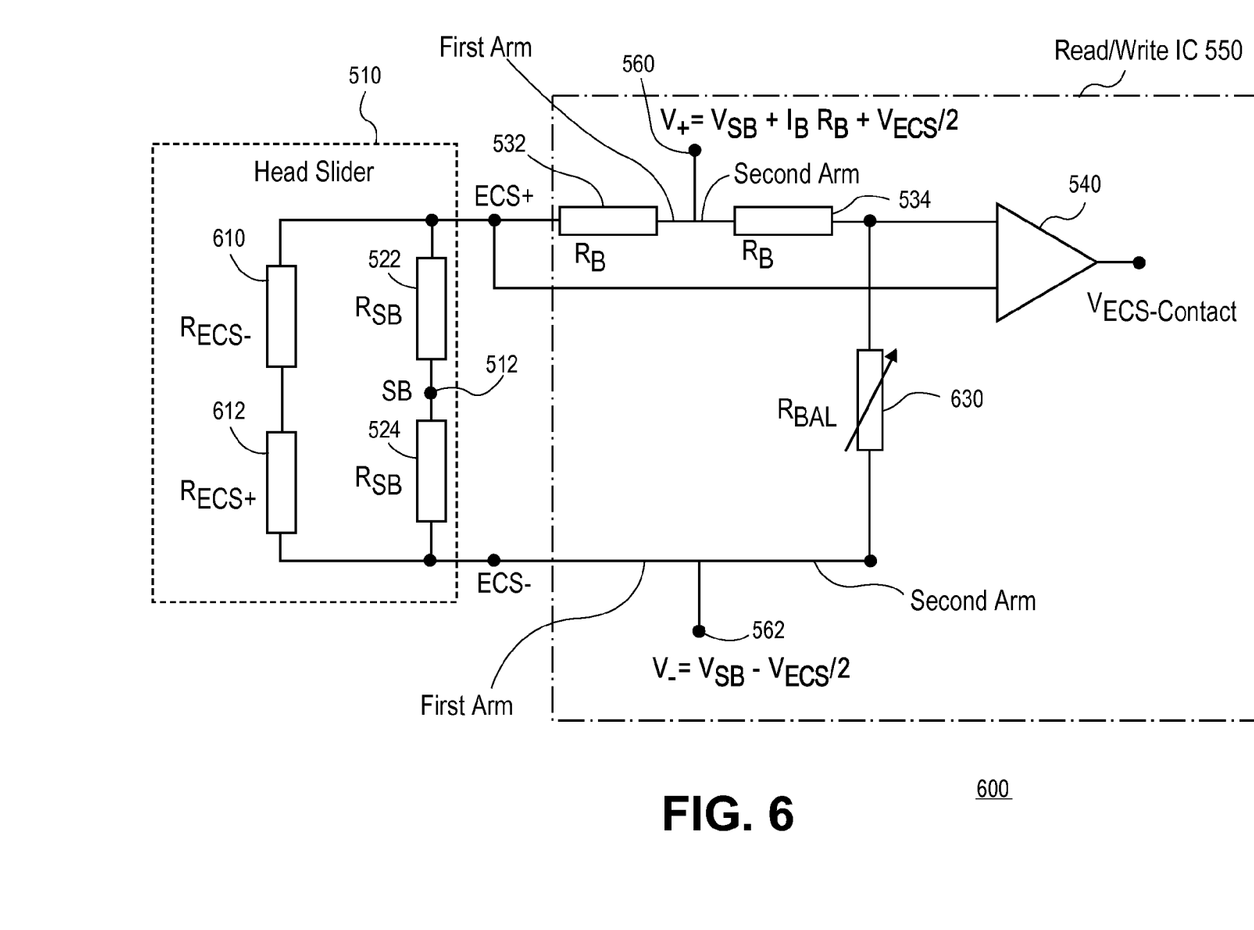
FIG. 6 depicts a balanced embedded contact sensor (bECS) architecture having two RTDs according to another embodiment of the invention.

FIG. 6 depicts a balanced embedded contact sensor (bECS) architecture 600 according to another embodiment of the invention. The circuit architecture of FIG. 6 may be that of a Wheatstone bridge type circuit, thus noise generated by the first arm of the circuit may be cancelled out by noise generated by the second arm of the circuit. Unless there is physical contact between head slider 510 and the magnetic-recording disk, the same amount of current will flow through both the first arm and the second arm of the circuit.

The embodiment of FIG. 6 comprises two RTDs, namely RTD 610 and RTD 612. RTDs 610 and 612 have resistance values $R_{ECS-}$ and $R_{ECS+}$ respectively. RTD 610 is constructed using a material that has an opposite temperature coefficient of resistance (TCR) than the material used to construct RTD 612. Resistor 612 may be placed close to the air bearing surface (ABS) of head slider 510 while resistor 610 is placed well inside of head slider 510, e.g., resistor 610 may be offset from the air bearing surface or embedded within head slider 510. When physical contact is made between head slider 510 and the magnetic-recording disk when the magnetic-recording disk is rotating, the resulting friction causes an increase in temperature within head slider 510 originating at the point of contact. The change in temperature resulting from the physical contact will be a gradient as a function of distance from the point of contact.

Resistor 630, having a resistance of $R_{BAL}$ and residing in read/write IC, is used to cancel the baseline resistance of both RTDs 610 and 612. For example, if RTDs 610 and 612 each have a resistance of 100 ohms, then resistor 630 will have a resistance of 200 ohms.

A change in temperature caused by physical contact between head slider 510 and the magnetic-recording disk will affect resistor 612 more than RTD 610 since RTD 612 is closer to the point of contact. As a result, the resistance of RTD 610 will change by a different magnitude than any change in resistance of RTD 610, since RTD 610 is further away from the point of contact. Therefore, the voltage across the first arm of circuit 600 will be different than the voltage across the second arm of circuit 600 when physical contact is made between head slider 510 and the magnetic-recording disk.

Note that environmental changes, such as a change in temperature, pressure, humidity, or altitude will affect RTDs 610 and 612 equally. Therefore, if the hard-disk drive contains a sensor which detects a change in the environment of the HDD, such as a change in temperature, pressure, humidity, or altitude, then it would not be necessary to recalibrate resistor 630, as the environmental change will have no affect on the total amount of resistance of RTD 610 and 612. This is so because any change in resistance in one of RTD 610 and 612 caused by such an environmental change will be cancelled out by an opposite change in resistance by the other of RTD 610 and 612.

Any common mode temperature changes will be partially cancelled since RTD 610 and 612 will vary in opposite directions with any ambient (non-contact related) temperature change. This embodiment offers the same noise advantages as the embodiment depicted in FIG. 5, but provides better cancellation of thermal signatures not related to contact between head slider 510 and the magnetic-recording disk. The embodiment of FIG. 6 also allows independent control of interface voltage control (IVC) and embedded contact sensors (ECS), but it does not allow absolute slider temperature measurements and requires special slider builds since two RTDs are employed within head slider 510.

The embodiments depicted in both FIG. 5 and FIG. 6 may both include an auto-zeroing power up and/or periodic calibration to zero-out the amplifier's input voltage.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A hard-disk drive, comprising:
   a head slider comprising a single resistive temperature detector (RTD);
   a magnetic-recording disk rotatably mounted on a spindle;
   a voice coil motor configured to move the head slider to access portions of said magnetic-recording disk;
   a read/write integrated circuit (IC) comprising a balance resistor that possesses the same resistance as the single RTD when the head slider is not in physical contact with the magnetic-recording disk,
   wherein the single RTD and the balance resistor are arranged in a circuit which causes the same amount of current to flow through both (a) a first arm of the circuit that includes the single RTD and (b) a second arm of the circuit that includes the balance resistor except when the head slider is in physical contact with the magnetic-recording disk,
   wherein a first voltage level associated with ground at the head slider is at a higher voltage level than a second voltage level associated with ground at the magnetic-recording disk,
   wherein the read/write IC comprises a plurality of resistors, and wherein electrical switches within the read/write IC are configured to place a portion of the plurality of resistors in series to form the balance resistor so that the portion of the plurality of resistors collectively have the same resistance as the single RTD when the head slider is not in physical contact with the magnetic-recording disk; and
   a mechanism for (a) detecting a change in altitude, pressure, or ambient temperature and (b) recalibrating the balance resistor upon detecting a change in altitude, pressure, or ambient temperature that exceeds a certain threshold.

2. The hard-disk drive of claim 1, wherein the head slider further comprises two slider resistors that are connected in series, wherein the two slider resistors are connected in parallel with the single RTD, and wherein the two slider resistors are disposed, in an electrical path, on either side of a voltage potential associated with a body of the head slider.

3. The hard-disk drive of claim 1, wherein the circuit is a Wheatstone bridge type circuit.

4. The hard-disk drive of claim 1, wherein noise generated by the first arm of the circuit is cancelled out by noise generated by the second arm of the circuit.

5. The hard-disk drive of claim 1, wherein the read/write IC measures a difference in voltage across the first arm and the second arm of the circuit to detect physical contact between the read/write head and the magnetic-recording disk.

6. The hard disk drive of claim 1, wherein the head-disk drive further comprising one or more electrical components that are configured to update the electrical switches to cause a different portion of the plurality of resistors to be placed in series to form the balance resistor as a result of a change in altitude, humidity, pressure, or temperature of the hard-disk drive, wherein the different portion of the plurality of resistors collectively have the same resistance as the single RTD after the change in altitude, humidity, pressure, or temperature of the hard-disk drive.

7. A hard-disk drive, comprising:
a head slider comprising a first resistive temperature detector (RTD) and a second resistive temperature detector (RTD), wherein the first RTD and the second RTD are connected in sequence,
and wherein a change in temperature causes (a) an increase in resistance of a particular magnitude in the first RTD and (b) a decrease in resistance of said particular magnitude in the second RTD;
a magnetic-recording disk rotatably mounted on a spindle;
a voice coil motor configured to move the head slider to access portions of said magnetic-recording disk; and
a read/write integrated circuit (IC) comprising a balance resistor that possesses the same resistance as a sum of the resistance of the first RTD and the second RTD when the head slider is not in physical contact with the magnetic-recording disk,
wherein the single RTD and the balance resistor are arranged in a circuit which causes the same amount of current to flow to both (a) a first arm of the circuit that includes the first RTD and the second RTD and (b) a second arm of the circuit that includes the balance resistor except when the head slider is in physical contact with the magnetic-recording disk,
wherein a first voltage level associated with ground at the head slider is at a higher voltage level than a second voltage level associated with ground at the magnetic-recording disk,
wherein the read/write IC comprises a plurality of resistors, and wherein electrical switches within the read/write IC are configured to place a portion of the plurality of resistors in series to form the balance resistor so that the portion of the plurality of resistors collectively have the same resistance as the single RTD when the head slider is not in physical contact with the magnetic-recording disk; and
a mechanism for (a) detecting a change in altitude, pressure, or ambient temperature and (b) recalibrating the balance resistor upon detecting a change in altitude, pressure, or ambient temperature that exceeds a certain threshold.

8. The hard-disk drive of claim 7, wherein the location of the first RTD and the second RTD within the head slider causes any physical contact between the head slider and the magnetic-recording disk to result in a greater temperature change in one of the first RTD and the second RTD.

9. The hard-disk drive of claim 7, wherein the first RTD and the second RTD are physically located within the read/write head such that environment changes affect the first RTD and the second RTD equally.

10. The hard-disk drive of claim 9, wherein said environmental changes include a change in pressure of the hard-disk drive, a change in temperature of the hard-disk drive, or a change in humidity of the hard-disk drive.

11. The hard-disk drive of claim 7, wherein the head slider further comprises two slider resistors that are connected in series, wherein the two slider resistors are connected in parallel with the single RTD, and wherein the two slider resistors are disposed, in an electrical path, on either side of a voltage potential associated with a body of the head slider.

12. The hard-disk drive of claim 7, wherein the circuit is a Wheatstone bridge type circuit.

13. The hard-disk drive of claim 7, wherein noise generated by the first arm of the circuit is cancelled out by noise generated by the second arm of the circuit.

14. The hard-disk drive of claim 7, wherein the read/write IC measures a difference in voltage across the first arm and the second arm of the circuit to detect physical contact between the read/write head and the magnetic-recording disk.

15. The hard disk drive of claim 7, wherein the head-disk drive further comprising one or more electrical components that are configured to update the electrical switches to cause a different portion of the plurality of resistors to be placed in series to form the balance resistor as a result of a change in altitude, humidity, pressure, or temperature of the hard-disk drive, wherein the different portion of the plurality of resistors collectively have the same resistance as the single RTD after the change in altitude, humidity, pressure, or temperature of the hard-disk drive.

16. A head-gimbal assembly (HGA), comprising:
a head slider comprising a single resistive temperature detector (RTD); and
a suspension coupled to the head slider,
wherein conductive paths within the head slider are adapted to cause the single RTD and a balance resistor to be arranged in a Wheatstone bridge type circuit that causes the same amount of current to flow through both (a) a first arm of the Wheatstone bridge type circuit that includes the single RTD and (b) a second arm of the circuit that includes the balance resistor except when the head slider is in physical contact with a magnetic-recording disk, and
wherein the balance resistor is not located within the head slider, and
wherein a first voltage level associated with ground at the head slider is at a higher voltage level than a second voltage level associated with ground at the magnetic-recording disk,
wherein the read/write IC comprises a plurality of resistors, and wherein electrical switches within the read/write IC are configured to place a portion of the plurality of resistors in series to form the balance resistor so that the portion of the plurality of resistors collectively have the same resistance as the single RTD when the head slider is not in physical contact with the magnetic-recording disk; and
a mechanism for (a) detecting a change in altitude, pressure, or ambient temperature and (b) recalibrating the balance upon detecting a change in altitude, pressure, or ambient temperature that excess a certain threshold.

17. A head-gimbal assembly (HGA), comprising:
a head slider comprising a first resistive temperature detector (RTD) and a second resistive temperature detector (RTD), wherein the first RTD and the second RTD are connected in sequence, and wherein a change in temperature causes (a) an increase in resistance of a particular magnitude in the first RTD and (b) a decrease in resistance of said particular magnitude in the second RTD; and a suspension coupled to the head slider, wherein conductive paths within the head slider are adapted to cause the single RTD and a balance resistor to be arranged in a circuit that causes the same amount of current to flow to both (a) a first arm of the circuit that includes the first RTD and the second RTD and (b) a second arm of the circuit that includes the balance resistor except when the head slider is in physical contact with a magnetic-recording disk, and wherein the balance resistor is not located within the head slider, and wherein a first voltage level associated with ground at the head slider is at a higher voltage level than a second voltage level associated with ground at the magnetic-recording disk, wherein the read/write IC comprises a plurality of resistors, and wherein electrical switches within the read/write are configured to place a portion of the plurality of resistors in series to form the balance resistor so that the portion of the plurality of resistors collectively have the same resistance as the single RTD when the head slider is not in physical contact with the magnetic-recording disk; and a mechanism for (a) detecting a change in altitude, pressure, or ambient temperature and (b) recalibrating the balance resistor upon detecting a change in altitude, pressure, or ambient temperature that exceeds a certain threshold.

18. The head-gimbal assembly (HGA) of claim 17, wherein the location of the first RTD and the second RTD within the head slider causes any physical contact between the head slider and the magnetic-recording disk to result in a greater temperature change in one of the first RTD and the second RTD.

19. The head-gimbal assembly (HGA) of claim 17, wherein the first RTD and the second RTD are physically located within the read/write head such that environment changes affect the first RTD and the second RTD equally.

20. The head-gimbal assembly (HGA) of claim 17, wherein the circuit is a Wheatstone bridge type circuit.

* * * * *